United States Patent [19]

Nakano et al.

[11] Patent Number: 5,072,844

[45] Date of Patent: Dec. 17, 1991

[54] RESERVOIR CAP

[75] Inventors: Toshihiro Nakano, Chiryu; Hitoshi Tauchi, Kariya, both of Japan

[73] Assignee: Aisin Seiki Kabushiki Kaisha, Kariya City, Japan

[21] Appl. No.: 658,657

[22] Filed: Feb. 21, 1991

[30] Foreign Application Priority Data

Feb. 28, 1990 [JP] Japan .............................. 02-20799[U]

[51] Int. Cl.$^5$ ............................................. B65D 41/00
[52] U.S. Cl. ........................................ 215/230; 40/615
[58] Field of Search ........................ 215/230; 220/212; 40/626, 661, 615

[56] References Cited

U.S. PATENT DOCUMENTS

| 2,880,542 | 4/1959 | Butterweich | 40/615 X |
| 4,077,145 | 3/1978 | Smoczynski | 40/615 X |
| 4,111,322 | 9/1978 | Obrist et al. | 215/230 |
| 4,753,358 | 6/1988 | Virca et al. | 215/230 |
| 4,998,989 | 3/1991 | Cariel | 215/230 X |

FOREIGN PATENT DOCUMENTS 918985 2/1963 United Kingdom .

Primary Examiner—Stephen Marcus
Assistant Examiner—Nova Stucker
Attorney, Agent, or Firm—Oblon, Spivak, McClelland, Maier & Neustadt

[57] ABSTRACT

A reservoir cap includes a cylinder portion of molded resin and surrounding an outer circumferential surface of an opening portion of a reservoir body, and a flat portion unitarily formed on the cylinder portion and closing the opening portion of the reservoir body. A transparent film is insert-molded to the outer surface of the flat portion. Descriptive characters are formed at an inner surface of the film. The film is made from the same material as the flat portion. It is therefore possible to obtain a high adhesion between the film and the flat portion of the reservoir cap because they have the same melting point. Therefore, it is possible to provide an improved reservoir cap having descriptive characters which are easily seen from the outside thereof at the flat portion, while ensuring a high chemical resistance and a high durability against the operational fluid. Furthermore, it is possible to improve the appearance of the reservoir cap while ensuring the high chemical resistance and the high durability against the operational fluid.

4 Claims, 2 Drawing Sheets

RESERVOIR CAP

BACKGROUND OF THE INVENTION

1. Field of the Invention

The present invention relates to a reservoir cap, and more particularly to the reservoir cap made of molded resin.

2. Description of the Related Art

A conventional reservoir cap of this kind is disclosed, for example, in Japanese utility model application laid-open publication No. 62-163463 published on Oct. 17, 1987. This conventional reservoir cap includes a cylinder portion formed of molded resin and having a engaging portion engaged with a outer circumferential surface of an opening portion of a reservoir body and a flat portion unitarily molded on the cylinder portion and closing the opening portion of the reservoir body.

In the above conventional reservoir cap the reservoir cap is a single piece cap of molded resin. Therefore, concavo-convex portions are generally formed on the flat portion in order to form descriptive characters (e.g., raised letters) which ar visible from the outside of the reservoir cap at the flat portion. However, the concavo-convex portions degrade the appearance of the reservoir cap and it is not possible to clearly see the characters. Furthermore, in the reservoir cap of a master cylinder reservoir of a hydraulic brake system or a hydraulic clutch system for automobiles, it has become desirable to color the characters at the flat portion of the reservoir cap in order to improve the appearance of the engine compartment. In the above conventional reservoir cap, however, it is not possible to satisfy this need. A colored film may instead be applied on the flat portion. However, it is not possible to ensure its chemical resistance and its durability against operational fluids such as brake fluid and so on.

SUMMARY OF THE INVENTION

It is, therefore, an object of the present invention to provide an improved reservoir cap on which descriptive characters at the flat portion are easily read while ensuring a high chemical resistance and a high durability against the operational fluid.

It is another object of the present invention to improve the appearance of the reservoir cap while ensuring high chemical resistance and high durability against operational fluids.

In order to achieve these objects, there is provided an improved reservoir cap including a cylinder portion formed of molded resin and surrounding a outer circumferential surface of an opening portion of a reservoir body, a flat portion unitarily formed on the cylinder portion and closing the opening portion of the reservoir body. A transparent film is insert-molded to the outer surface of the flat portion and has descriptive characters which are visible from the outside of the reservoir cap formed at an inner surface thereof. The film is made from the same material as the flat portion.

BRIEF DESCRIPTION OF THE DRAWINGS

Additional objects and advantages of the present invention will become more apparent from the following detailed description of preferred embodiment thereof when considered with reference to the attached drawings. In which.

DESCRIPTION OF THE PREFERRED EMBODIMENT

A reservoir cap constituted in accordance with a preferred embodiment of the present invention will be described with reference of the drawings.

Figure 1:
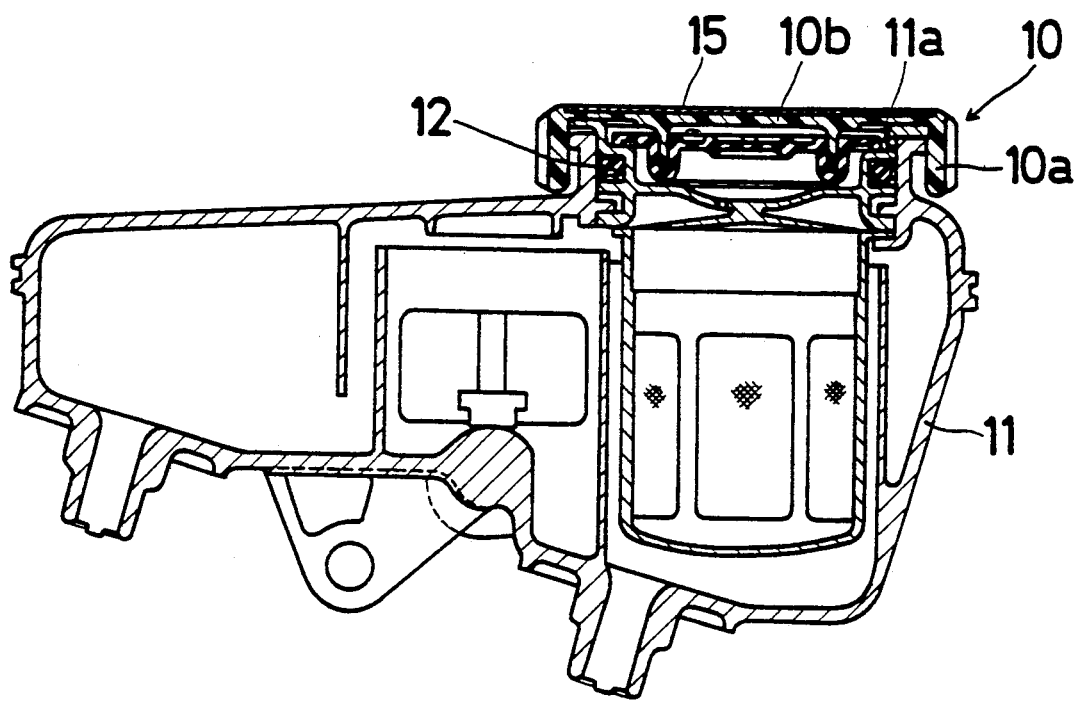
FIG. 1 and FIG. 2 are cross sectional views of an embodiment of a reservoir cap in accordance with the present invention, respectively.
Figure 2:
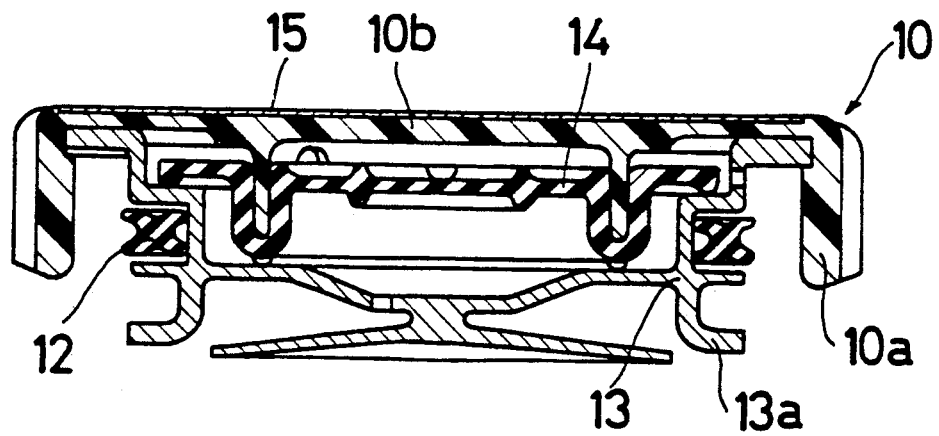

In FIG. 1 and FIG. 2 of the appended drawings, a reservoir cap 10 is disposed so as to liquid-tightly close an opening portion 11a of a reservoir body 11 via a seal ring 12. The reservoir body 11 is connected with a master cylinder (not shown) and stores operational fluid therein.

In this non-limiting embodiment, the reservoir cap 10 is molded from 6-nylon and has a cup-shape. The reservoir cap 10 includes a cylinder portion 10a surrounding an outer circumferential surface of the opening portion 11a of a reservoir body 11 and a flat portion 10b unitarily formed with the cylinder portion 10a. An engaging member 13 which is fitted with the seal ring 12 on an outer surface thereof is connected with the reservoir cap 10. The engaging member 13 has an engaging portion 13a, and the engaging portion 13a is engaged with a projection portion 11b which is formed in an inner surface of the opening portion 11a. An elastic member 14 is interposed between the engaging member 13 and the flat portion 10b. The elastic member 14 constitutes a unidirectional valve together with the engaging member 13.

Figure 3:
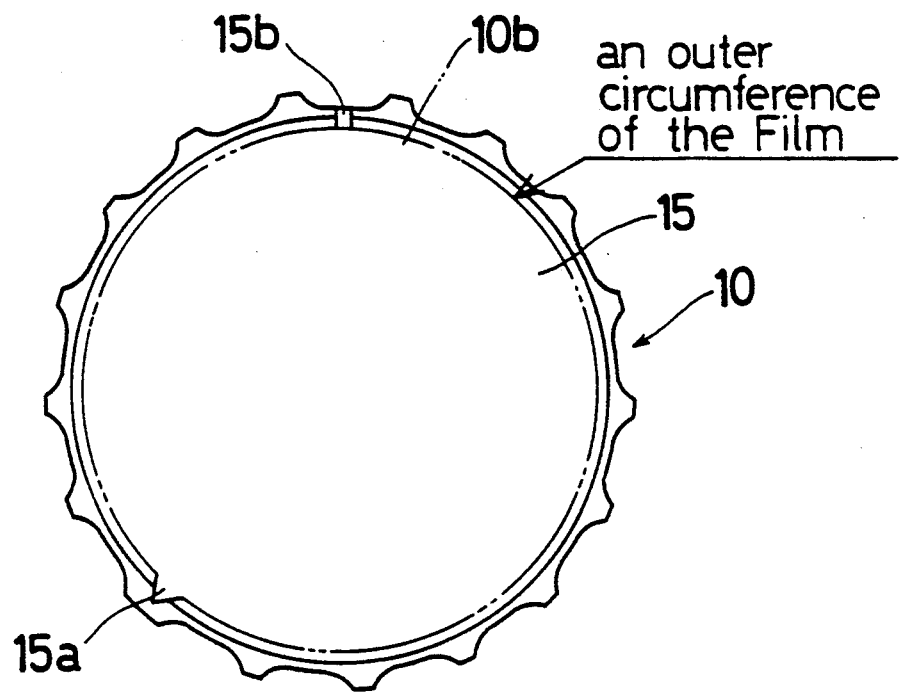
FIG. 3 is a plan view of an embodiment of a reservoir cap in accordance with the present invention.

A transparent flat board-shaped film 15 is insert-molded in the flat portion 10b of the reservoir cap 10 in such a way that an outer surface thereof and an outer surface of the flat portion 10b are coplanar, as shown in FIG. 2. At the inner surface of the film 15 are printed characters which are visible from outside of the reservoir cap 10. The film 15 is also made from 6-nylon and has projection portions 15a and 15b at an outer circumference surface thereof in order to correctly position the film 15 with regard to the reservoir cap 10 as shown in FIG. 3.

Figure 4:
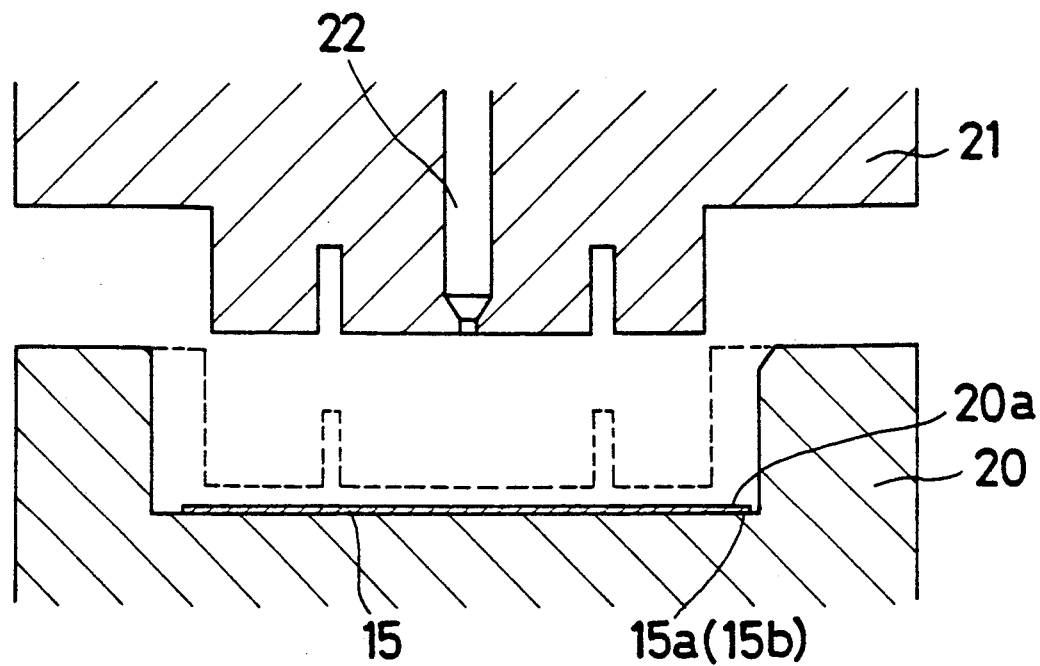
FIG. 4 is a cross section view of an embodiment of a molding method for a reservoir cap in accordance with the present invention.

The film 15 is insert-molded as follows. The projection portions 15a and 15b are fitted in concave portions 20a which are formed in a lower mold 20 as shown in FIG. 4. Thereafter, an upper mold 21 is fitted to the lower mold and the 6-nylon is poured into the space between the molds 20, 21 via a gate 22. An adhesive may be applied on the inner surface of the film 16 as occasion demands. The film 15 is melted and is fused with the reservoir cap 10 during the molding operation.

According to the above-described embodiment, since the film 15 is made from the same material (6-nylon) as the reservoir cap 10, it is possible to obtain a high adhesion between the film 15 and the flat portion 10b of the reservoir cap 10 because, for example, they have the melting point. Therefore, there is a degree of freedom with respect to the choice of the adhesive which is applied between the film 15 and the flat portion 10b. Furthermore, the adhesive may be unnecessary, which reduces the manufacturing costs.

Furthermore, according to this embodiment, the characters are positioned at an inner surface of the film 15 and are not directly contacted with the operational fluid or chemicals due to the high adhesion between the film 15 and the flat portion 10b of the reservoir cap 10. Therefore, it is possible to provide an improved reservoir cap in which characters are surely visible from the outside of the flat portion, while ensuring a high chemical resistance and a high durability against the operational fluid. Furthermore, it is possible to improve the appearance of the reservoir cap while ensuring high chemical resistance and high durability against operational fluids.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A reservoir cap comprising:

a cylinder portion of molded resin for surrounding an outer circumferential surface of an opening portion of a reservoir body;

a flat portion unitarily formed with the cylinder portion for closing the opening portion of the reservoir body, and a transparent film having an inner surface insert-molded to the flat portion at an outer surface of the flat portion and made from a material identical to that of the flat portion, wherein descriptive characters which are visible from outside of the reservoir cap are formed at the inner surface of the film.

2. A reservoir cap as recited in claim 1, wherein an outer surface of the film and the outer surface of the flat portion are coplanar.

3. A reservoir cap recited in claim 2, wherein the film has a projection portion at an outer circumference thereof in order to correctly position the film on the flat portion.

4. A reservoir cap as recited in claim 2, including an engaging member incorporated with the flat portion and having an engaging means for engaging an inner surface of an opening portion of the reservoir body.

* * * * *